United States Patent [19]

Dudek

[11] Patent Number: 4,732,221
[45] Date of Patent: Mar. 22, 1988

[54] PNEUMATIC CHIPPING HAMMER AND METHOD OF MANUFACTURE

[75] Inventor: Edmund C. Dudek, Johnson City, Tenn.

[73] Assignee: Stewart-Warner Corporation, Chicago, Ill.

[21] Appl. No.: 5,599

[22] Filed: Jan. 21, 1987

[51] Int. Cl.$^4$ .............................................. B23B 45/04
[52] U.S. Cl. .................................. 173/170; 29/157 R; 29/527.1; 29/527.3; 29/DIG. 10; 264/263; 264/275
[58] Field of Search ............... 29/157 R, 527.1, 527.3, 29/530, 458, DIG. 10, DIG. 25, DIG. 29; 173/168, 169, 170; 264/263, 275

[56] References Cited

U.S. PATENT DOCUMENTS

| | | | |
|---|---|---|---|
| 1,027,062 | 5/1912 | Norling | 173/170 X |
| 1,557,777 | 10/1925 | Santos | 173/169 X |
| 2,221,100 | 11/1940 | Lear | 173/169 X |
| 2,641,439 | 6/1953 | Williams | 29/527.3 X |
| 2,864,338 | 12/1958 | Zimmermann | 173/169 |
| 4,303,131 | 12/1981 | Clark | 173/168 X |
| 4,342,144 | 8/1982 | Doguchi | 29/527.1 X |

FOREIGN PATENT DOCUMENTS 2091329  5/1982  United Kingdom ................ 29/530

Primary Examiner—P. W. Echols
Assistant Examiner—Andrew E. Rawlins
Attorney, Agent, or Firm—Lorusso & Loud

[57] ABSTRACT

A pneumatic power tool that includes fluid conveying passageways formed by casting grooves in the tool exterior and then molding an elastomeric material over the grooves to enclose the passageways.

16 Claims, 11 Drawing Figures

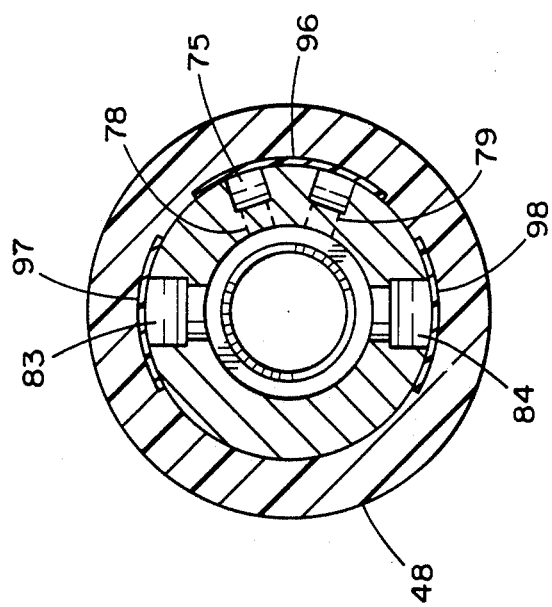
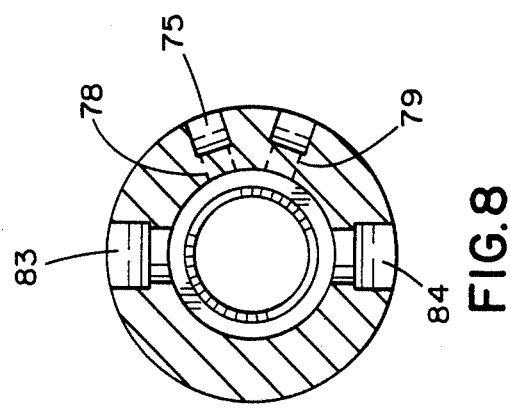
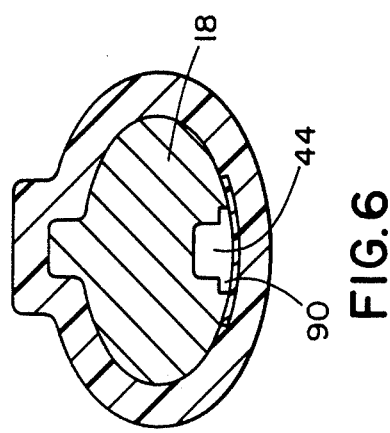
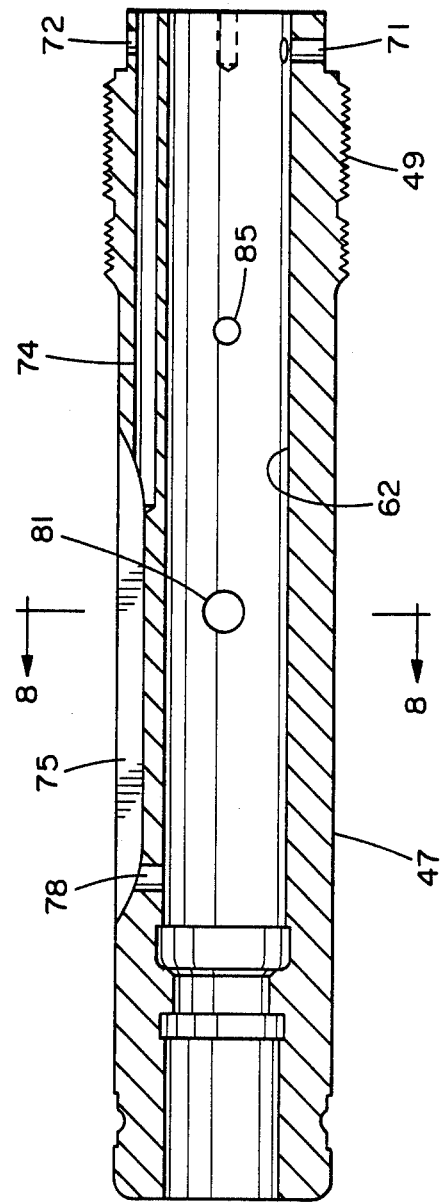

PNEUMATIC CHIPPING HAMMER AND METHOD OF MANUFACTURE

BACKGROUND OF THE INVENTION

Pneumatic power tools have been used extensively in industrial and construction applications for well over the last century. These tools frequently are pneumatic grinders, drills and wrenches in industrial applications and paving breakers, earth borers and chipping hammers in the construction industry.

All these tools, however, have the same basic configuration, including a reciprocating piston or rotary air motor for driving or impacting an associated tool and a handle portion with an operator-controlled trigger and valve assembly that connects compressed air from a fitting to the motor. Fluid passageways are conventionally formed in the handle portion and in a tool body portion that is adjacent to the motor for conveying air under pressure to the motor.

The formation of the air passages in the handle portion and in the tool body has always been a problem because it is not economically practical to core these passageways during the forging operations for the handle and the tool body, particularly where these fluid passageways must be curved to accommodate the configuration of the tool. For these reasons, the fluid passageways in the handle portion and the tool body are today formed largely by drilling operations subsequent to the forging of the parts. Where the passageways must curve or turn, it is necessary to drill multiple angularly related intersecting bores in the tool and then cap the exterior openings of the bores with a weldment to seal the passageway. This multiple drilling technique requires different machine setups because of their angular relationship and has been found to be a very significant cost factor in the overall tool cost.

It is a primary object of the present invention to ameliorate the problems noted above in forming fluid passageways in pneumatic power tools.

SUMMARY OF THE PRESENT INVENTION

In accordance with the present invention, a pneumatic power tool and method of manufacture are provided in which most of the fluid passageways in the tool handle portion and tool body are formed by casing external grooves in the parts, covering the grooves with high temperature resistant tape and then molding a highly elastic thermosetting elastomeric material around the parts covering the tape and grooves to form the fluid passageways. In addition to forming the passageways, the elastomeric coating provides an insulated, comfortable, non-slip hand grip for the operator.

This method of manufacture eliminates the requirement for drilling even straight passageways but more importantly eliminates the requirement for drilling multiple intersecting passageways and welding the passageways closed at their external openings to form angular or generally curved passageways.

While the present invention has utility in a variety of fluid operated power tools, it is specifically represented in the present specification as a chipping hammer, which is a relatively small hand-held pneumatic tool that reciprocates a blade-type tool used to break away hard particulate surfaces such as vertical cementatious ones. These tools conventionally include an arcuate handle having a trigger-operated on/off valve adjacent a compressed air inlet at the end of the handle. The handle is connected to a straight barrel portion that reciprocably receives a piston which impacts the end of a blade-type chipping tool.

Fluid passageways are formed in both the handle and the barrel by substantially the same technique according to the present invention. In the handle, which like the barrel is a steel casting, a groove is formed in the casting operation in the exterior of the part from the trigger valve to the portion of the handle into which the barrel is threaded. This is far simpler than coring an internal passage. After casting, this groove is covered by a high temperature fiberglass tape that has a contact adhesive on one side thereof. The handle with the taped groove is then placed into a mold as an insert and a polyurethane elastomer is cast completely around most of the handle covering the tape and the groove. The polyurethane is a high tear strength, high elongation resin with a shore A durometer of 75 to 85. The polyurethane is cured or polymerized in the mold in a curing oven at approximately 300 degrees F. for 11 minutes. The resulting urethane coating on the handle is approximately 0.250 inches in thickness, sufficiently thick to withstand the 90 to 100 psi air pressure normally encountered in pneumatic tools of this type.

Air delivery and exhaust passages are similarly cast in the tool barrel, covered with tape and then encapsulated with a polyurethane molding.

Other objects and advantages will appear more clearly in the following detailed description of the present chipping hammer.

BRIEF DESCRIPTION OF THE DRAWINGS

FIG. 6 is a cross-section of the tool handle after the addition of the polyurethane molding taken generally along line 6—6 of FIG. 5;

FIG. 7 is a longitudinal section of the tool barrel prior to polyurethane encapsulation illustrating one of the piston return passageways;

FIG. 8 is a cross-section of the tool barrel taken generally along line 8—8 of FIG. 7;

DETAILED DESCRIPTION OF THE PREFERRED EMBODIMENT

Figures 1, 3, 4:
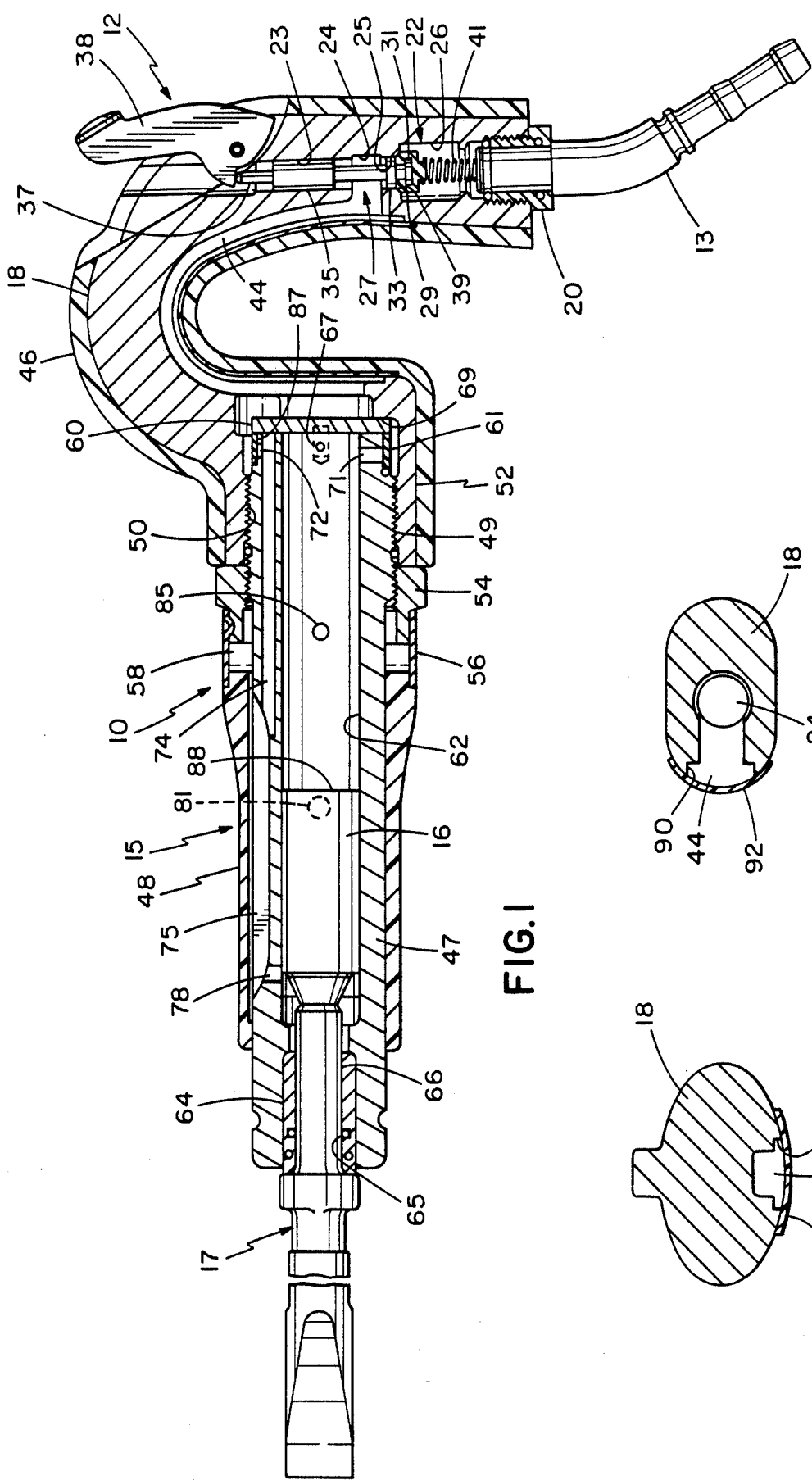
FIG. 1 is a longitudinal section of the chipping hammer according to the present invention.
FIG. 3 is a cross-section taken generally along line 3—3 of FIG. 2 illustrating the fluid passage in the handle covered by high temperature tape.
FIG. 4 is a cross-section of the chipping hammer illustrating part of the fluid passage therein covered by high temperature tape taken generally along line 4—4 of FIG. 2.

Referring to the drawings, and particularly FIG. 1, a chipping hammer 10 is illustrated according to the present invention generally including a handle assembly 12 having an air inlet swivel 13, a barrel assembly 15, defining a motor with reciprocating piston 16, and a reciprocably mounted bladed point or "steel" 17 adapted to be impacted by piston 16 as it reciprocates in the barrel assembly 15.

While the present invention is shown incorporated into chipping hammer 10, it should be understood that the principles of forming fluid passageways according to the present invention are applicable to other fluid-operated power tools as well, particularly those that require curved or turning fluid passageways.

The handle assembly 12 includes an arcuate portion 18 having a generally circular cross-section that is a one-piece steel casting. Handle portion 18 has an inlet fitting 20 threaded into its free end that rotatably receives the air inlet swivel 13 adapted to be connected to a source of compressed air such as a motor driven compressor. A central stepped bore 22 is provided in handle 18 that includes an upper reduced diameter portion 23, a somewhat enlarged central portion 24, a reduced pilot portion 25 and an enlarged chamber portion 26. A valve assembly 27 is reciprocably mounted in stepped bore 22 and includes a valve head 29 carried on an enlarged land 31, a small guide land 33 slidable in bore portion 25, a second guide land 35 slidable in bore 33, and a stem portion 37 engageable and depressable by a pivotal trigger 38. The valve assembly 27 is biased to its closed position where valve head 29 engages seat 39 in handle 18, by a coil compression spring 41 that reacts against the lower side of valve 29. Upon depression of trigger 38 by the operator's hand, valve assembly 27 will move to its open position porting fluid from the inlet swivel 13 across open valve seat 39 into chamber 24 and through arcuate handle passageway 44 to the barrel assembly 15. Upon release of trigger 38, the valve assembly closes. The handle casting 18 is covered by a polyurethane thermosetting coating 46 that is applied by the method described more clearly hereinbelow.

The barrel assembly 15 is seen to include an elongated straight cylindrical steel casting 47 covered by a polyurethane coating 48 similar to coating 46 around handle portion 18. Barrel casting 47 has a threaded inner end 49 threadedly received in a threaded bore 50 in a forwardly extending end 52 of handle portion 18. Barrel casting 47 is locked to the handle portion 18 by a lock nut 54 and an annular metal deflector 56 spans an exhaust space 58 between lock jam nut 54 and polyurethane coating 48, and it has an unshown slot that forms an exhaust passage from the chipping hammer 10. The operator may rotatably adjust the deflector 56 so that it exhausts air away from his or her body.

The barrel assembly 15 generally includes a valve cap 60, a ring valve 61 that selectively ports fluid under pressure to both sides of the piston 16, a cylinder bore 62 slidably receiving piston 16, and a bushing 64 carrying a seal 65 that slidably receives shank 66 on tool 17.

The valve cap 60 is circular in configuration and is pinned to the barrel 47 by a pair of diametral pins 67 and is axially locked against shoulder 69 in the end of handle portion bore 50.

The cap 60 serves to axially locate the ring valve 61 which is annular in configuration having circular inner and outer surfaces.

Figure 9:
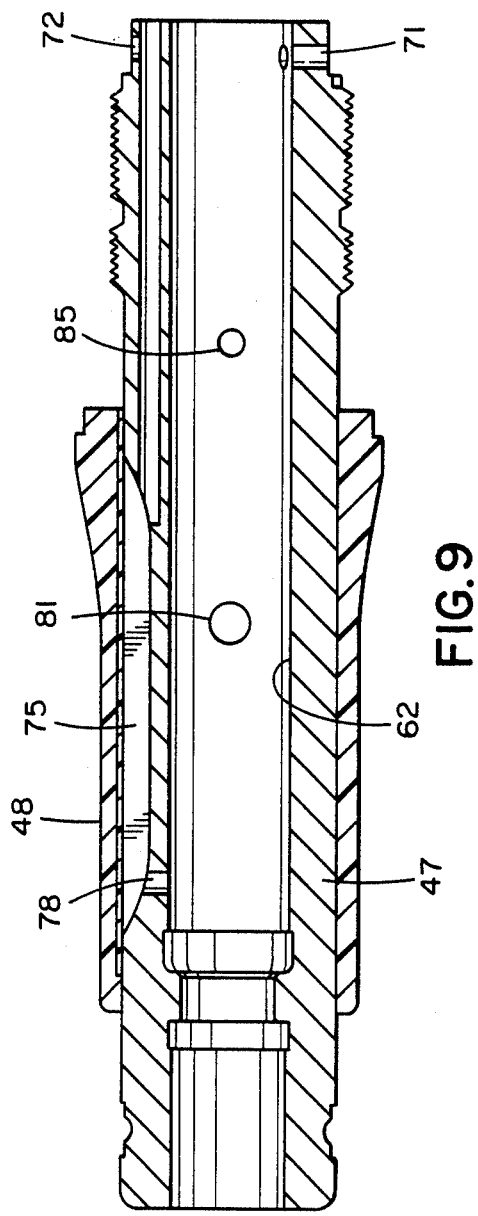
FIG. 9 is a longitudinal section of the tool barrel similar to FIG. 7 after polyurethane encapsulation.

The barrel member 47, as seen in FIGS. 1, 7 and 9, has a radial forward port 71 and a diametrally opposed radial return port 72 that are controlled by the radial movement of ring valve 61 to port fluid to opposite sides of the piston 16. Port 71 communicates with the rear side of piston 16 in cylinder 62 while port 72 communicates with the forward side of piston 16 through two closely spaced axial passages 74, two adjacent communicating scalloped grooves 75 in the periphery of the barrel member 47, and radial ports 78 and 79.

The barrel casting 47 has exhaust passageways communicating with chamber 58 including a pair of diametrally opposed central ports 81 and 82 that communicate with axially arcuate grooves 83 and 84 that in turn communicate with exhaust chamber 58. Similarly, diametrally opposed ports 85 and 86 communicate with exhaust through grooves 83 and 84.

The valve 61 effects alternate pressurization of ports 71 and 72 by slight vertical movement in the plane of FIG. 1. This vertical movement is possible because the reduced diameter surface 87 on the end of the barrel 47 on which the ring 61 is seated has eccentrically disposed upper and lower semi-cylindrical surfaces with the same length radius formed on centers on the vertical axis of barrel 47 spaced 0.022 inches from one another with the radii overlapping. The radius of these two upper and lower surfaces is equal to the inner radius of ring valve 61 so it seats and seals against both surfaces although not at the same time. The resulting vertical diameter of surface 87 is 0.022 inches less than the inner diameter of valve ring 61 enabling ring 61 to shift upwardly to close port 71 and open port 72 and to shift downwardly to close port 72 and open port 71 depending upon the differential pressure acting on ring valve 61.

Assuming ring valve 61 to be in its lower position opening port 71, fluid pressure is applied to the right side of the piston and with the piston in its rearmost position, air pressure applied to the right side of piston 16 drives it forwardly in the cylinder 62. As rear end 88 of the piston uncovers ports 85, 86, the right end of cylinder 62 will be exhausted through ports 85, 86, and the piston 16 then proceeds forwardly under its own inertia. At about the same time piston 16 covers exhaust ports 81, 82, so that the forward end of the cylinder 62 is blocked from exhaust causing a pressure rise on the forward side of piston 16, which is transmitted through return passages 78, 79, 75 and 74 to port 72 causing ring valve 61 to shift upwardly in the plane of FIG. 1 opening port 72 to inlet fluid pressure in passage 44, and closing lower port 71. This causes inlet fluid pressure to be applied to the forward end of piston 16 reversing movement of the piston after impacting steel 17 with fluid in the right side of piston 16 exhausting through ports 85, 86, across deflector 56. After piston 16 closes exhaust ports 85, 86, and at about the same time opens exhaust ports 81, 82, pressure increases on the rear side of piston 16 and drops on the forward side thereof causing a pressure increase at port 71 and a pressure decrease at port 72 resulting in ring valve 61 shifting downwardly in the plane of FIG. 1, reversing movement of the piston prior to impacting cap 60.

According to the present invention the passageway 44 in the handle assembly 12 and the passageways 75, 83 and 84 in the barrel assembly 15 are formed by a unique method that eliminates the requirement for complex drilling and welding.

Figure 2:
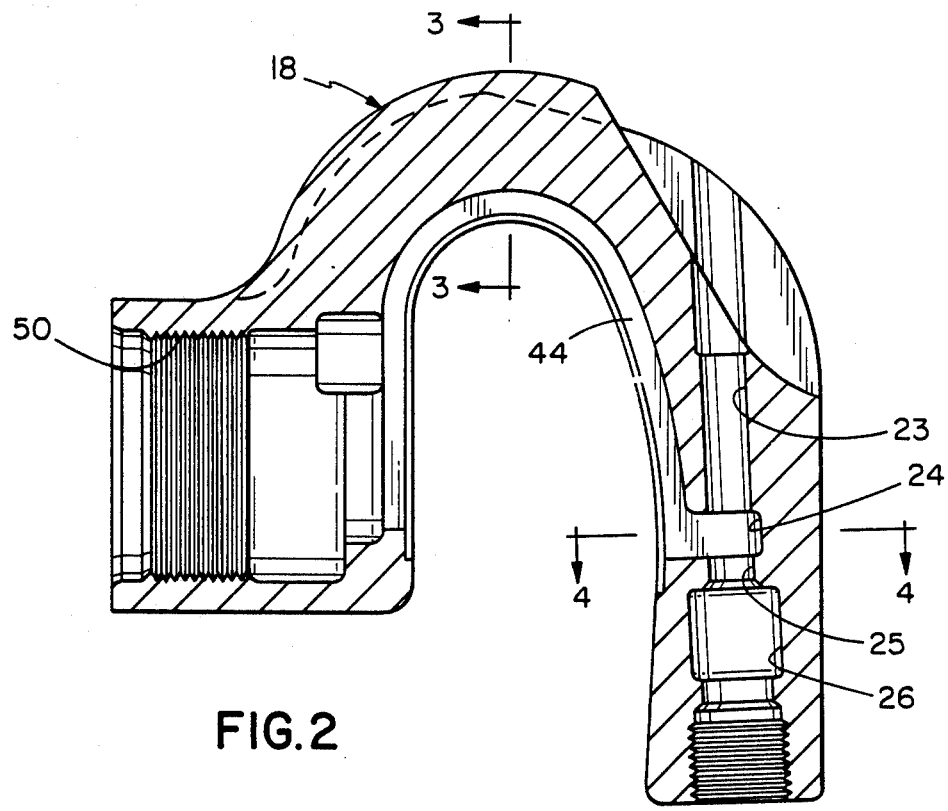
FIG. 2 is an enlarged sub-assembly view in longitudinal section of the handle member of the chipping hammer illustrated in FIG. 1 in its as cast condition.
Figure 5:
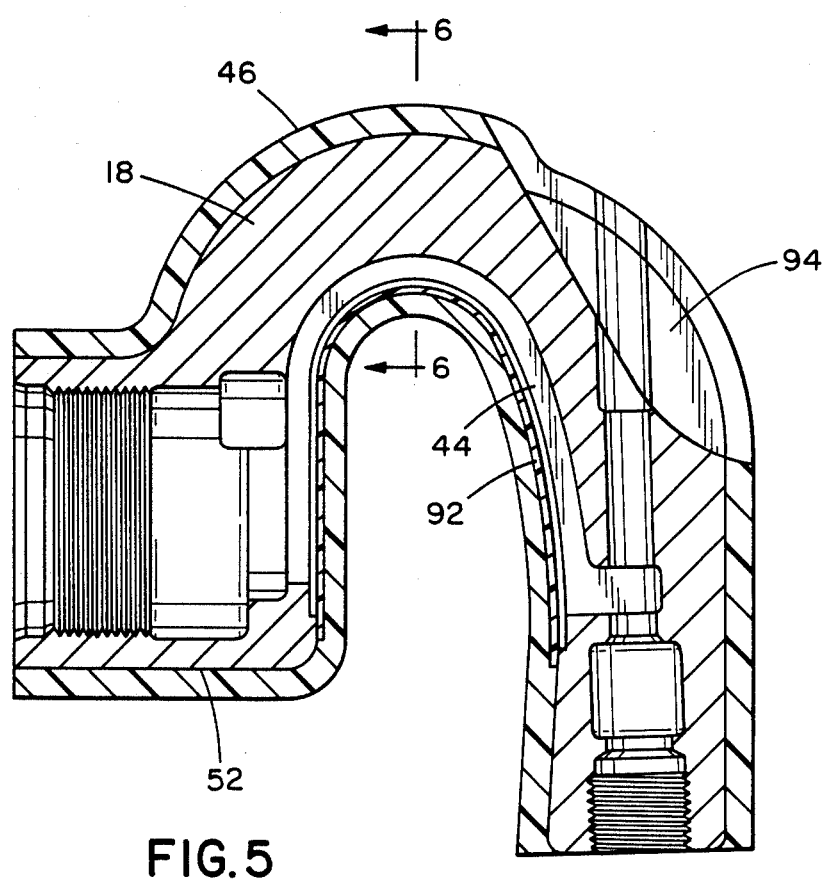
FIG. 5 is a longitudinal section of the handle assembly coated with polyurethane.

As seen in FIG. 2, the arcuate handle portion or member 18 is a steel casting that is formed as cast with an arcuate groove on its inner periphery that has an enlarged portion 90 as seen in FIGS. 3, 4 and 6. After casting the handle portion 18, the entire exterior surface of the handle 18 is carefully cleaned and dried and a high temperature fiberglass tape 92 is applied over the groove 44 along its entire length as seen in FIG. 5, including the length of the enlarged portion 90. Tape 92 is a high temperature tape capable of withstanding at least 320 degrees F., and it carries an acrylic contact adhesive on one side thereof. One such tape that has been found suitable for this purpose is Temp. R. Tape No. G569 manufactured by CHR Industries of New Haven, Conn.

After the application of the high temperature tape 92 to the handle 18, the handle 18 is placed in a mold as an insert with the mold having a cavity configuration complementary to the periphery of the total assembly as shown in FIG. 5. A highly elastomeric polyurethane resin is thoroughly mixed with an appropriate moca catalyst, evacuated to remove air entrapments, and poured into the mold around the casting 18 forming a coating of approximately 0.250 inches around the periphery of the casting 18 except for trigger slot 94, which remains uncovered. Tape 92 serves to preserve the integrity of the passage 44 and the enlarged grooved portion 90 as seen in FIGS. 3, 4 and 5, during the molding operation.

The mold with the handle 18 as an insert is then placed in an oven at approximately 300 degrees F. for about 12 minutes polymerizing and curing the polyurethane mixture. Several polyurethanes, such as the high elongation thermosetting polyurethanes manufactured by Uniroyal Chemical Company, under the trademarks Vibrathane or Adiprene L-42, can be used for this purpose so long as the resulting coating has a shore A durometer in the range of 75 to 85 with high tear strength and high elongation (in the range of 700 to 850) characteristics to withstand the pulsing of high pressure 90 to 100 psi air in the tool passageways.

Figure 10:
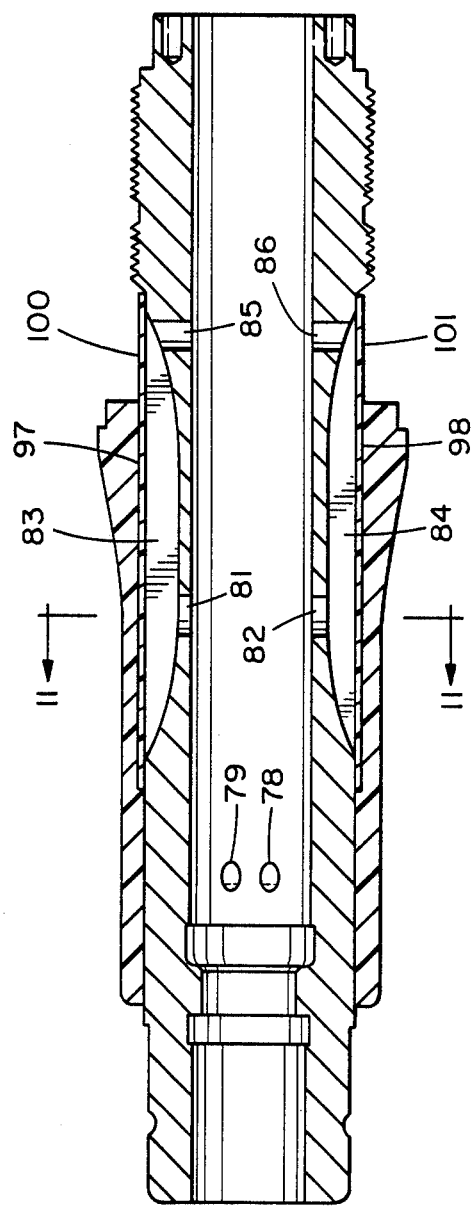
FIG. 10 is a longitudinal section of the cylinder barrel taken through the exhaust passageways after encapsulation with polyurethane; and, FIG. 11 is a cross-section of the encapsulated cylinder barrel taken generally along line 11—11 of FIG. 10.

Portions of the passageways in the barrel assembly 15 are formed in a similar manner to the passageway 44 in the handle assembly 12. Viewing FIGS. 7, 8 and 11, adjacent grooves 75, 83 and 84 are cast into the barrel 47, which is a steel casting and then the same high temperature tape 96, 97 and 98 is applied to grooves 75, 83 and 84. Thereafter, barrel 47 is placed into a mold as an insert having a cavity configuration complementary to the outer periphery of the assembly shown in FIGS. 9 and 10, and the same polyurethane mixture is poured into the mold, and the mold heated to cure the polyurethane coating illustrated in FIGS. 1, 9 and 10 in exactly the same manner as the coating 46 around the handle 18.

After curing, the tape portions 100 and 101 of tapes 97 and 98 are removed opening passages 83 and 84 to the periphery of the barrel assembly. This technique enables cross passages to be easily formed.

In the above manner, the majority of the passageways normally formed in the tool handle and the barrel are cast, rather than drilled, in the steel parts and covered, enclosed and sealed in an efficient and highly reliable way with a heavy thermosetting polyurethane coating.

I claim:

1. A fluid operated power tool comprising: a tool body adapted to receive a fluid motor for driving a tool carried by the tool body, a handle portion connected to the tool body having an inlet adapted to be connected to a source of fluid under pressure, a passageway in the handle portion and the tool body adapted to carry fluid under pressure from the inlet to the fluid motor in the tool body, at least a portion of the passageway being formed by a groove in the exterior of the handle portion, high temperature tape covering the groove, and an elastomeric material insert molded around the handle portion and covering the tape and groove.

2. A fluid operated power tool, comprising: a tool body adapted to receive a fluid motor for driving a tool carried by the tool body, a handle portion connected to the tool body having an inlet adapted to be connected to a source of fluid under pressure, passageways in the handle portion and the tool body adapted to carry fluid under pressure from the inlet to the fluid motor in the tool body, at least a portion of the passageway being formed by a groove in the exterior of the tool body, high temperature tape covering the groove, and an elastomeric material insert molded around the tool body and covering the tape and groove.

3. A fluid operated power tool comprising: a tool body adapted to receive a fluid motor for driving a tool carried by the tool body, a handle portion connected to the tool body having an inlet adapted to be connected to a source of fluid under pressure, passageways in the handle portion and the tool body adapted to carry fluid under pressure from the inlet to the fluid motor in the tool body, at least a portion of the passageway in the handle portion being formed by a groove in the exterior thereof, at least a portion of the passageway in the tool body being formed by a groove in the exterior thereof, high temperature tape covering both of the grooves, and an elastomeric material insert molded around the handle portion and tool body and covering the tapes and grooves.

4. A fluid operated power tool, as defined in claim 1, wherein the passageway in the handle portion is curved.

5. A method of making a fluid operated power tool, including the steps of: forming a fluid motor assembly adapted to drive a tool, forming a fluid receiving portion for receiving fluid under pressure and carrying it to the motor assembly, said step of forming the fluid receiving portion including the steps of forming a fluid passage on the exterior of the fluid receiving portion opening along its length to the atmosphere, covering the fluid passage, and molding an elastomeric material around the fluid receiving portion and the covered fluid passage of sufficient thickness to withstand fluid pressure in the fluid passage.

6. A method of making a fluid operated power tool, as defined in claim 5, wherein the step of forming the fluid receiving portion includes the step of casting the fluid receiving portion with the fluid passage therein using a metallic material.

7. A method of making a fluid operated power tool, as defined in claim 5, wherein the step of covering the fluid passage includes covering the fluid passage with a high temperature tape.

8. A method of making a fluid operated power tool, as defined in claim 5, wherein the step of molding an elastomeric material includes placing the fluid receiving portion in a mold as an insert and flowing an elastomeric thermosetting material there-around and heating the mold until the thermosetting material is cured.

9. A method of making a fluid operated power tool, as defined in claim 5, including covering the entire fluid passage in the fluid receiving portion, said step of molding an elastomeric material around the fluid receiving portion including molding the elastomeric material over only part of the covered fluid passage, and thereafter removing the cover from the part of the fluid passage not covered by the elastomeric material to provide exterior communication of the fluid passage through the fluid receiving portion.

10. A method of making a fluid operated power tool, as defined in claim 5, wherein the step of forming a fluid passage in the fluid receiving portion includes forming a curved fluid passage.

11. A method of making a fluid operated power tool, including the steps of: forming a tool body adapted to receive a fluid motor for driving a tool carried by the tool body, forming a handle portion with a fluid inlet adapted to be connected to the tool body and carrying fluid under pressure from the inlet to the fluid motor in the tool body, the step of forming the handle portion including casting the handle portion with a fluid passage connected to the inlet exposed along its length to the periphery of the handle portion adapted to carry fluid under pressure to the motor, covering the fluid passage with a high temperature tape applied to the outside of the handle portion, placing the handle portion in a mold as an insert, flowing a thermosetting elastomeric material around the handle portion, and heating the mold until the elastomeric material has cured.

12. A method of making a fluid operated power tool, including the steps of: forming a tool body adapted to receive a fluid motor for driving a tool carried by the tool body, forming a handle portion with a fluid inlet adapted to be connected to the tool body and carrying fluid under pressure from the inlet to the fluid motor in the tool body, the steps of forming the tool body including the step of casting the tool body with a fluid passage connected to the inlet exposed along its length to the exterior of the tool body, covering the fluid passage with a high temperature tape, placing the tool body in a mold as an insert, flowing an elastomeric thermosetting material around the tool body and over the fluid passage, and heating the mold until the elastomeric material is cured.

13. A method of making a fluid operated power tool, as defined in claims 11 or 12, wherein the step of flowing an elastomeric material includes the step of mixing a curing agent and a polyurethane resin.

14. A method of making a fluid operated power tool, as defined in claims 11 or 12, wherein the high temperature tape is a fiberglass tape with a high temperature contact adhesive on one side thereof.

15. A method of making a fluid operated power tool, including the steps of: forming a tool body adapted to receive a fluid motor for driving a tool carried by the tool body, forming a handle portion with a fluid inlet adapted to be connected to the tool body and carrying fluid under pressure from the inlet to the fluid motor in the tool body, the step of forming the handle portion including casting the handle portion with a fluid passage connected to the inlet exposed along its length to the periphery of the handle portion adapted to carry fluid under pressure to the motor, covering the fluid passage with a high temperature tape applied to the outside of the handle portion, placing the handle portion in a mold as an insert, flowing a thermosetting elastomeric material around the handle portion, heating the mold until the elastomeric material has cured, the step of forming the tool body including the step of casting the tool body with a fluid passage connected to the inlet exposed along its length to the exterior of the tool body, covering the fluid passage in the tool body with a high temperature tape, placing the tool body in a mold as an insert, flowing an elastomeric thermosetting material around the tool body and over the fluid passage therein and heating the mold until the elastomeric material is cured.

16. A method of making a fluid operated power tool, as defined in claim 14, wherein the step of flowing an elastomeric material around the tool body includes the step of flowing the elastomeric material over part of the fluid passage, and after curing the elastomeric material removing the tape from the part of the fluid passage not covered with elastomeric material so that the fluid passage communicates with the exterior of the tool body.

* * * * *